(12) United States Patent
Ishida et al.

(10) Patent No.: US 9,254,842 B2
(45) Date of Patent: Feb. 9, 2016

(54) DRIVING SUPPORT DEVICE

(71) Applicant: HONDA MOTOR CO., LTD., Minato-Ku, Tokyo (JP)

(72) Inventors: Shinnosuke Ishida, Utsunomiya (JP); Daisuke Hanzawa, Utsunomiya (JP); Shun Iwasaki, Shioya-Gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/519,695

(22) Filed: Oct. 21, 2014

(65) Prior Publication Data
US 2015/0134218 A1    May 14, 2015

(30) Foreign Application Priority Data
Nov. 8, 2013  (JP) ................................. 2013-232407

(51) Int. Cl.
*B60W 30/00*    (2006.01)
*B60W 30/09*    (2012.01)
(Continued)

(52) U.S. Cl.
CPC *B60W 30/00* (2013.01); *B60T 7/12* (2013.01); *B60T 7/22* (2013.01); *B60T 2201/022* (2013.01); *B60T 2201/08* (2013.01); *B60T 2201/089* (2013.01); *B60W 30/09* (2013.01)

(58) Field of Classification Search
CPC .................. G01S 13/93; G01S 13/931; G01S 2013/9321; G01S 2013/9325; G01S 2013/9342; G01S 2013/9346; G01S 2013/935; G01S 2013/9353; G01S 2013/9357; G01S 2013/9375; G01S 2013/9382; G08G 1/16; G08G 1/165; G08G 1/166; G08G 1/167; G08G 1/168; B60W 30/00

USPC ............ 701/1, 23–36, 41, 48, 51, 70, 93–98, 701/300, 301; 340/901–904, 435–437
See application file for complete search history.

(56) References Cited

U.S. PATENT DOCUMENTS 6,717,546 B2 *  4/2004  Winter .................. G01S 7/4026
                                                342/118
7,084,772 B2 *  8/2006  Oyama .................. G08B 21/06
                                                340/575

(Continued)

FOREIGN PATENT DOCUMENTS

JP    H08-253160 A    10/1996
JP    2004-110394 A    4/2004

(Continued)

OTHER PUBLICATIONS

Office Action issued in the corresponding Japanese Patent Application 2013-232407, with a mailing date of Aug. 18, 2015, and the English translation thereof.

*Primary Examiner* — Thomas Tarcza
*Assistant Examiner* — Tyler J Lee
(74) *Attorney, Agent, or Firm* — Carrier Blackman & Associates, P.C.; Joseph P. Carrier; William D. Blackman

(57) ABSTRACT

The driving support device includes: a recognition section configured to recognize each positions of a specific object and a road marking with reference to peripheral information of a own vehicle acquired by a sensor section configured to acquire the peripheral information; and a control section configured to perform different controls on the own vehicle, with reference to recognition results of the recognition section, depending on whether the specific object is present in a first state or a second state, the first state being a state where the specific object is present in a region more outside than a traveling lane with respect to an imaginary line that extends along a traveling direction of the own vehicle, the second state being a state where the specific object is present in a region on a more central side of the traveling lane with respect to the imaginary line.

17 Claims, 10 Drawing Sheets

(51) Int. Cl.
  *B60T 7/12*   (2006.01)
  *B60T 7/22*   (2006.01)

(56) References Cited

U.S. PATENT DOCUMENTS

| | | | |
|---|---|---|---|
| 7,262,710 B2* | 8/2007 | Watanabe et al. | 340/903 |
| 8,847,792 B2* | 9/2014 | Tsunekawa | 340/933 |
| 2005/0046579 A1* | 3/2005 | Oyama | G08B 21/06 340/575 |
| 2005/0114000 A1* | 5/2005 | Cashler | 701/45 |
| 2005/0187684 A1* | 8/2005 | Hijikata et al. | 701/45 |
| 2007/0233386 A1* | 10/2007 | Saito et al. | 701/300 |
| 2008/0059037 A1* | 3/2008 | Isaji et al. | 701/93 |
| 2009/0243912 A1* | 10/2009 | Lohmeier et al. | 342/70 |
| 2012/0072097 A1* | 3/2012 | Ohta et al. | 701/118 |
| 2012/0300072 A1* | 11/2012 | Kim | 348/148 |
| 2013/0308821 A1* | 11/2013 | Okada et al. | 382/103 |
| 2015/0039156 A1* | 2/2015 | Shibata | 701/1 |

FOREIGN PATENT DOCUMENTS

| | | |
|---|---|---|
| JP | 2005-041459 A | 2/2005 |
| JP | 2006-327497 A | 12/2006 |
| JP | 2010-052716 A | 3/2010 |
| JP | 2010-235072 A | 10/2010 |
| JP | 2011-221654 A | 11/2011 |
| JP | 2012-068754 A | 4/2012 |

* cited by examiner

DRIVING SUPPORT DEVICE

CROSS-REFERENCE TO RELATED APPLICATION

Priority is claimed on Japanese Patent Application No. 2013-232407, filed on Nov. 8, 2013, the contents of which are incorporated herein by reference.

BACKGROUND

1. Field of the Invention

The present invention relates to a driving support device.

2. Description of Related Art

In the related art, there is known a vehicle driving support device that predicts, when detecting a vehicle present on a lateral side of the own vehicle, a future lateral position of the own vehicle in a predetermined amount of time and starts to perform, if it is determined that the predicted future lateral position of the own vehicle locates more outside than a predetermined position in a lane width direction with respect to lane lines when viewed from the center of the own vehicle lane, a control of the own vehicle so that a yaw moment which towards the center of the own vehicle lane is given to the own vehicle (for example, refer to Japanese Unexamined Patent Application, First Publication No. 2010-052716).

SUMMARY

The related art device is more focused to avoid collision with a vehicle that is traveling parallel with the own vehicle, and a consideration of protection against a specific object such as a pedestrian is not sufficient.

In consideration of such a circumstance, an object of the invention is to provide a driving support device capable of reliably protecting the specific object from collision with the vehicle.

In order to solve the above-mentioned problem and to achieve the relating object, the invention employs the following aspects.

(1) According to an aspect of the invention, there is provided a driving support device including: a recognition section configured to recognize each positions of a specific object and a road marking with reference to peripheral information of a own vehicle acquired by a sensor section configured to acquire the peripheral information; and a control section configured to perform different controls on the own vehicle, with reference to recognition results of the recognition section, depending on whether the specific object is present in a first state or a second state, the first state being a state where the specific object is present in a region more outside than a traveling lane with respect to an imaginary line that extends along a traveling direction of the own vehicle, the second state being a state where the specific object is present in a region on a more central side of the traveling lane with respect to the imaginary line.

(2) In the driving support device according to the aspect of (1), the control section may perform a control for preventing the own vehicle from deviating from the traveling lane if the specific object is present in the first state, and may perform a braking control of the own vehicle if the specific object is present in the second state.

(3) In the driving support device according to the aspect of (1) or (2), the control section may perform, when a speed of the own vehicle is equal to or greater than a predetermined speed, different controls on the own vehicle depending on whether the specific object is present in the first state or is present in the second state.

(4) In the driving support device according to any one of the aspects of (1) to (3), the control section may perform, when a size of a steering angle of the own vehicle is smaller than a predetermined value, different controls on the own vehicle depending on whether the specific object is present in the first state or is present in the second state.

(5) In the driving support device according to any one of the aspects of (1) to (4), the control section may define the imaginary line as a line that extends toward a front side of the own vehicle from a central part in a vehicle width direction of a front end part of the own vehicle.

(6) In the driving support device according to any one of the aspects of (1) to (4), the control section may define the imaginary line as a line that extends toward a front side of the own vehicle from one of a right end part or a left end part of the own vehicle depending on which side the specific objects is present.

According to the driving support device of the aspect of (1), since the different controls are performed on the own vehicle depending on whether the specific object is present in the first state, a state where the specific object is present in the region more outside than the traveling lane with respect to the imaginary line that extends along the traveling direction of the own vehicle (on a side where the own vehicle deviates from the traveling lane), or the specific object is present in the second region, a state where the specific object is present in the region more closer to the central side of the traveling lane with respect to the imaginary line, it is possible to reliably protect the specific object from collision with the own vehicle.

According to the driving support device of the aspect of (2), since the control for preventing the own vehicle from deviating from die traveling lane is performed if the specific object is present in the first state, and the braking control of the own vehicle is performed if the specific object is present in the second state, it is possible to reliably protect the specific object from collision with the own vehicle.

According to the driving support device of the aspects of (3) and (4), it is possible to prevent a control which has a relatively high probability in acting against the wishes of a driver, and to reduce driver discomfort.

According to the driving support device of the aspect of (6), it is possible to perform the control on a safer side, and to reliably protect the specific object from collision with the own vehicle.

DESCRIPTION OF THE EMBODIMENTS

Figure 1:
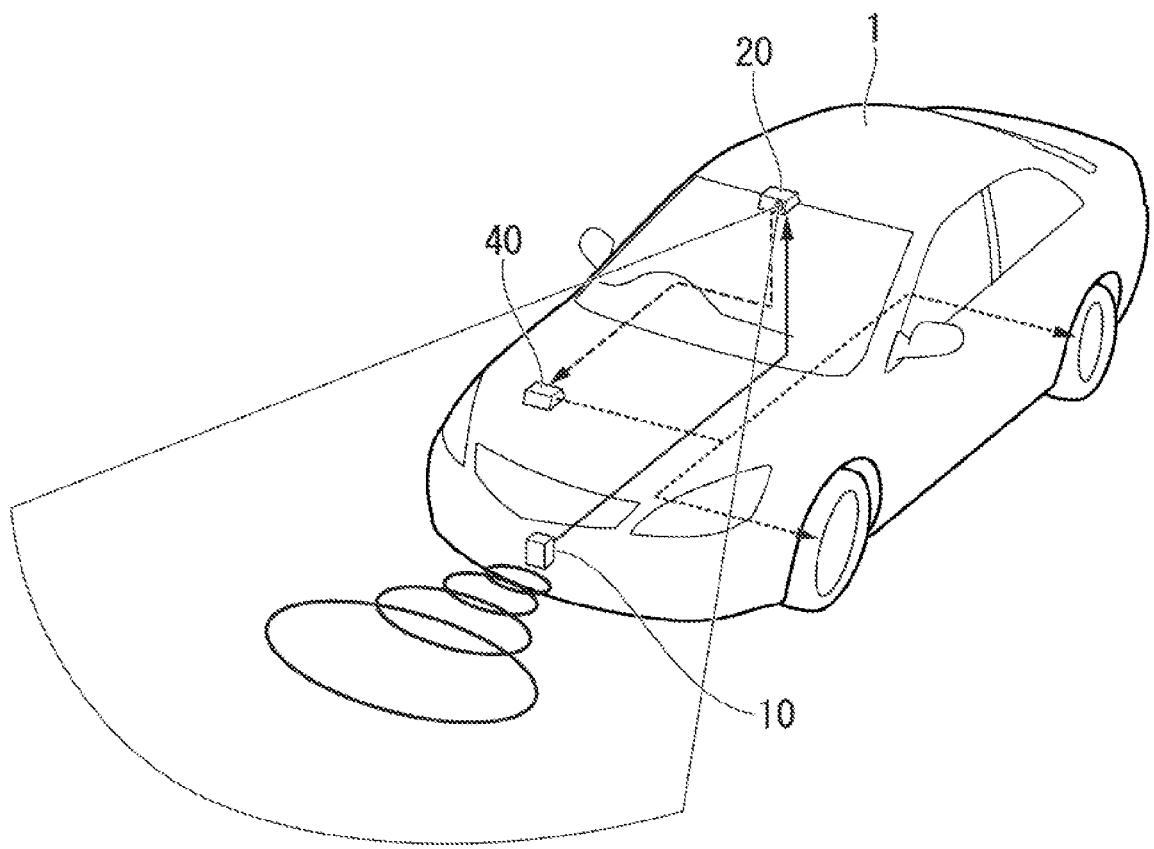
FIG. 1 is a diagram schematically showing a vehicle on which a driving support device according to an embodiment of the invention is mounted.
Figure 2:
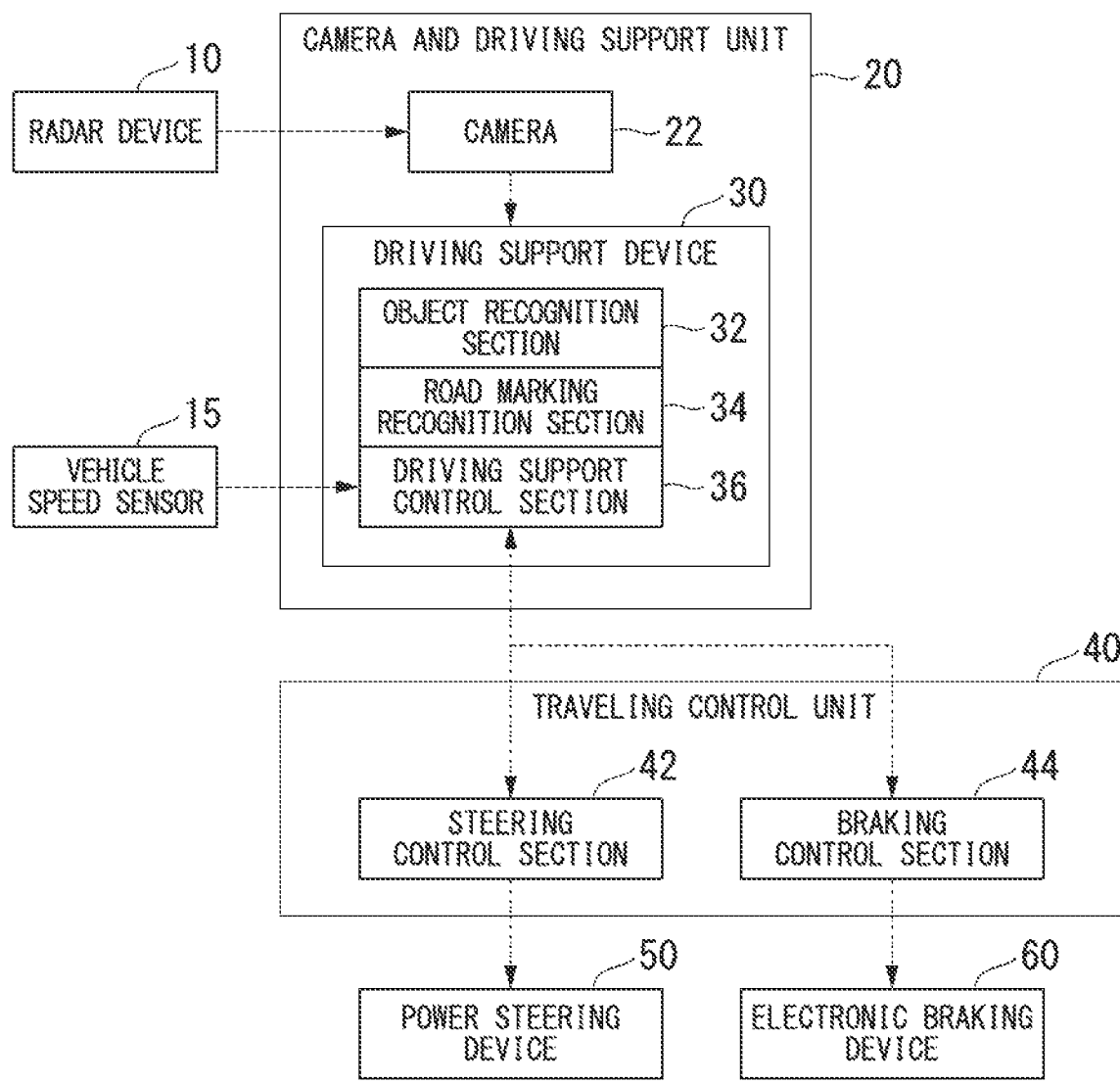
FIG. 2 is a diagram showing an example of a functional configuration of a driving support device and associated devices thereof.

Hereinafter, embodiments of a driving support device of the present invention will be described with reference to the accompanying drawings. FIG. 1 is a diagram schematically showing a vehicle 1 on which a driving support device 30 according to the present embodiment is mounted. FIG. 2 is a diagram showing an example of a functional configuration of the driving support device 30 and associated devices thereof. On the vehicle 1, a radar device 10 (sensor section), a camera and driving support unit 20 in which a camera 22 (sensor section) and the driving support device 30 are built, and a traveling control unit 40 are mounted.

The radar device 10 is mounted, for example, in a front grill part of the vehicle 1. The radar device 10 radiates an electromagnetic wave (for example, millimeter wave) to a front side of the vehicle 1, receives a reflection wave reflected from an object, and outputs the distance and direction to the object obtained by analyzing the reflection wave to the camera and driving support unit 20. The radar device 10 may output information about the strength of the reflection wave corresponding to the object, or the like, in addition to the distance and direction to the object, to the camera and driving support unit 20.

The camera and driving support unit 20 accommodates, for example, the camera 22 and the driving support device 30 in a casing. The camera 22 is, for example, a complementary metal oxide semiconductor (CMOS) camera or a charge coupled device (CCD) camera attached above a front glass which captures an image of a front side downwardly inclined in a frontward direction of the vehicle 1. The output of the radar device 10 and the image captured by the camera 22 are input to the driving support device 30. Further, a detection value of a vehicle speed sensor 15 that detects a vehicle speed of the vehicle 1 is input to the driving support device 30. Here, an example in which the driving support device 30 is disposed inside the camera and driving support unit 20 is shown, but the invention is not limited thereto. For example, the driving support device 30 may be disposed in any part of the vehicle 1. Further, the driving support device 30 may be combined with another existing different control device, by performing a part of the function of the different control device.

The driving support device 30 is, for example, a control device in which a central processing unit (CPU) that is a central component, a read only memory (ROM), a random access memory (ROM), a hard disk chive (HDD), a flash memory, and the like are connected to each other through a bus. The driving support device 30 includes, for example, an object recognition section 32, a road marking recognition section 34, and a driving support control section 36. These functional sections may be provided as software functional sections that function as the CPU executes a program stored in the ROM or the like. Further, all or some of the functional sections may be provided as hardware functional sections such as a large scale integrated (LSI) circuit or an application specific integrated circuit (ASIC).

The object recognition section 32 recognizes the position and type of the object based on a combination of information about the distance and direction of the object, or the like output from the radar device 10 and information obtained from the image captured by the camera 22. Here, the type of the object includes, for example, a "specific object" including a pedestrian, a person who is riding a bicycle, or the like. As the type of the object different from the specific object, a vehicle, a road sign or the like may be considered. The object recognition section 32 recognizes, as the specific object, an object that satisfies various conditions in which the strength of the reflection wave received in the radar device 10 is within a predetermined range and the shape thereof in an image has an aspect ratio within a predetermined range, for example. With respect to the object recognition of the pedestrian or the like, since various techniques are known, a description thereof will be omitted here.

Figure 3:
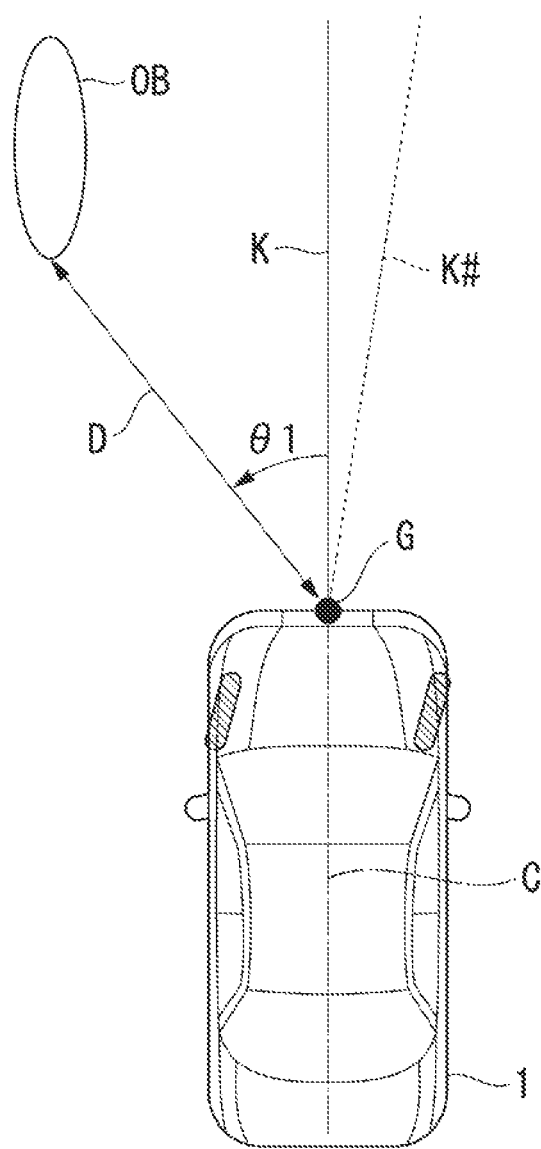
FIG. 3 is a diagram conceptually showing a recognition result in an object recognition section.

The recognition result in the object recognition section 32 is represented, for example, as a position of the object on an imaginary plane defined with reference to the vehicle 1 and a traveling direction of the vehicle 1. FIG. 3 is a diagram conceptually showing the recognition result in the object recognition section 32. In FIG. 3, reference sign K represents an imaginary line that extends in the traveling direction of the vehicle 1, reference sign D represents the distance between an object OB and the vehicle 1, and $\theta 1$ represents the direction in which the object OB is present. A reference point G for these parameters may be positioned at any location in the vehicle 1, which may be positioned at a location where the radar device 10 is attached (a front end part of the vehicle 1 and a central part thereof in a vehicle width direction) as an example.

Here, the imaginary line K is an imaginary reference line that is defined on the imaginary plane by the driving support device 30. The imaginary line K may extend on an extension line of a central axis (central axis with reference to the vehicle width direction) C of the vehicle 1, or may be deflected in a steering direction from the extension line of the central axis C of the vehicle 1 while taking a steering angle at that time point in to account (see reference sign K# in FIG. 3). The imaginary line K# in FIG. 3 represents a state where the vehicle is steered in a rightward direction and is thus deflected in the rightward direction.

Figure 4:
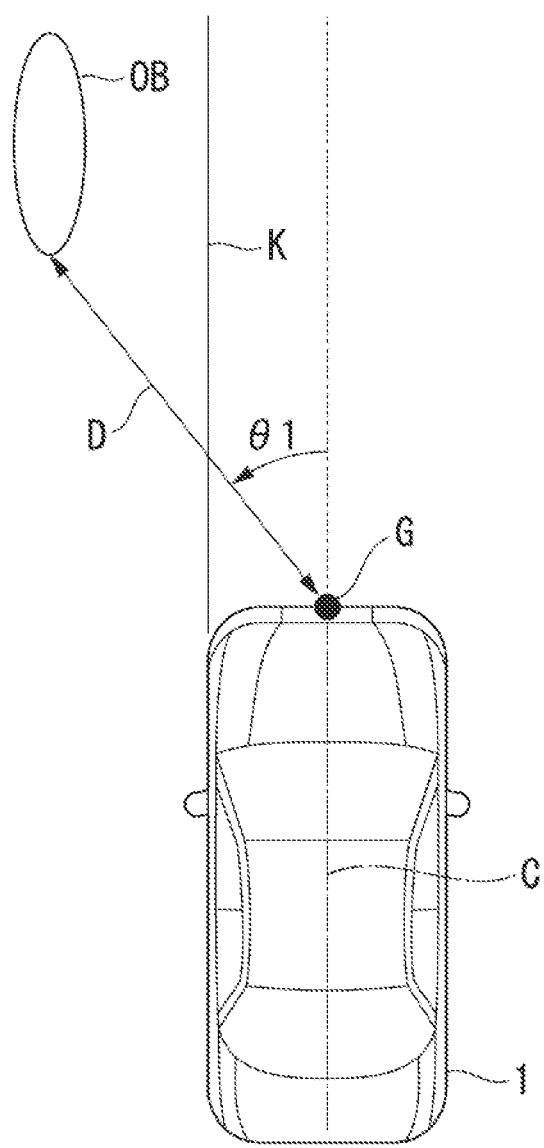
FIG. 4 is a diagram showing a state where an imaginary line extends from a left end part of a vehicle.

Further, the imaginary line K may not only extend in the frontward direction of the vehicle 1 from the reference point G that is positioned at the front end part of the vehicle 1 and the central part thereof in the vehicle width direction as shown in FIG. 3. Instead, when the object OB is present on the left side when seen from the vehicle 1, the imaginary line K may be defined to extend from, for example, a left end part of the vehicle 1, and when the object OB is present on the right side when seen from the vehicle 1, the imaginary line K may be defined to extend from, for example, a right end part of the vehicle 1. Further, the imaginary line K may be defined to extend from an arbitrary location between the right end part of the vehicle 1 and the central part thereof in the vehicle width direction, or from an arbitrary location between the left end part of the vehicle 1 and the central part thereof in the vehicle width direction. FIG. 4 is a diagram showing a state where the imaginary line K extends from the left end part of the vehicle 1. With this configuration, when a process to be described later is performed, it is possible to perform a control on a safer side. In the present embodiment, the object is recognized by the radar device 10 and the camera 22, but instead, information about the object recognized based on an image captured by a camera provided at a road edge may be transmitted to the vehicle 1 through wireless communication.

The road marking recognition section 34 recognizes road marking that extend on the road. The road marking include a solid or broken line of a white or yellow color, and a dot stream line such as Botts Dots or cat's eyes. For example, the road marking recognition section 34 extracts feature points (for example, points having a luminance gradient of a predetermined value or greater) in the image captured by the camera 22, further extracts feature points that are arranged in a linear shape, and performs pattern matching or the like to recognize the road marking that is, for example, drawn on the road or is embedded in the road. Further, the road marking recognition section 34 may recognize the road marking of a dot stream shape using a morphology operation or the like.

Figure 5:
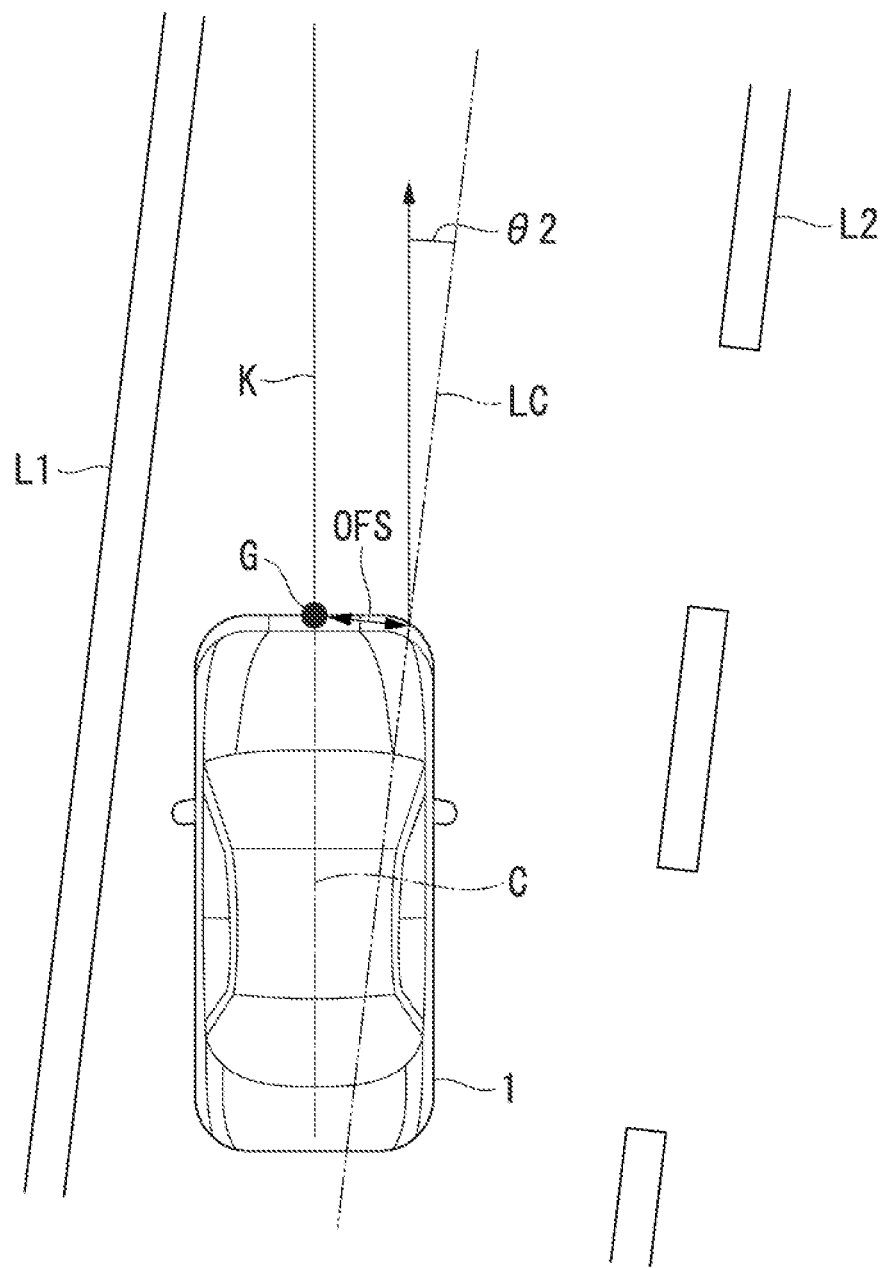
FIG. 5 is a diagram conceptually showing a recognition result in road marking recognition section.

FIG. 5 is a diagram conceptually showing a recognition result in the road marking recognition section 34. In FIG. 5, reference sign L1 represents road marking consisting of a solid line that extends on the left side of the vehicle 1, and reference sign L2 represents a road marking consisting of a broken line that extends on the right side of the vehicle 1. Further, for example, the road marking recognition section 34 calculates an offset distance OFS between a central line LC of a traveling lane which is the center of the road markings L1 and L2 and the reference point G of the vehicle 1, and an angle θ2 formed by an advancing direction of the vehicle and the central line LC of the traveling lane and outputs the calculation result.

The driving support control section 36 generates a control signal for performing a steering assist control or a braking assist control with reference to the recognition results in the object recognition section 32 and the road marking recognition section 34, and outputs the generated control signal to the traveling control unit 40. Details of the controls will be described later, and the traveling control unit 40 will first be described.

As shown in FIG. 2, the traveling control unit 40 includes, for example, a steering control section 42, and a braking control section 44. The steering control section 42 controls a power steering device 50.

The power steering device 50 includes, for example, an electric motor capable of changing the direction of steering wheels by applying power to a rack-and-pinion function and the like, a steering torque sensor, a steering angle sensor that detects a steering angle (or actual steering angle), and the like.

The steering control section 42 detects steering torque generated as a driver operates a steering wheel, and rotates the electric motor in a direction corresponding to the steering torque to assist the steering operation of the driver. Further, if a control signal is input from the driving support device 30, the steering control section 42 drives the electric motor according to a direction and a magnitude indicated by the control signal.

When the steering operation of the driver and the input of the control signal are simultaneously performed, the steering control section 42 may preferentially control the steering operation of the driver, or may perform a control in consideration of both the steering operation of the driver and the input of the control signal. For example, when the steering operation of the driver and the direction indicated by the control signal match each other, the steering control section 42 may control the electric motor so that the ratio of the output of the electric motor to the steering torque becomes larger than normal, or may control the electric motor so that an output corresponding to the sum of the output based on the steering torque and the output based on the control signal is performed. Further, the steering control section 42 outputs a steering angle signal indicating a detection value of the steering angle sensor to the driving support device 30.

Further, the braking control section 44 controls an electronic braking device 60. The electronic braking device 60 includes a master cylinder in which a braking operation performed on a braking pedal is transmitted as hydraulic pressure, a reservoir tank that stores a braking fluid, a braking actuator that adjusts a braking force output to each vehicle wheel, and the like. The braking control section 44 controls the braking actuator or the like so that a braking torque according to the pressure of the master cylinder is output to each vehicle wheel. Further, if a control signal is input from the driving support device 30, the braking control section 44 controls the braking actuator or the like so that a braking torque of a magnitude indicated by the control signal is output to each vehicle wheel.

When the braking operation of the driver and the input of the control signal are simultaneously performed, the braking control section 44 may preferentially control the braking operation of the driver, or may perform a control in consideration of both the braking operation of the driver and the input of the control signal. For example, when the braking operation of the driver and the input of the control signal are simultaneously performed, the braking control section 44 may control the electric motor so that the ratio of the output of the electric motor to the braking operation (change in the pressure of the master cylinder) becomes larger than normal, or may control the braking actuator or the like so that an output corresponding to the sum of the output based on the braking operation and the output based on the control signal is performed. The electronic braking device 60 is not limited to the above-described electronic braking device operated by the hydraulic pressure, and may be an electronic braking device operated by an electric actuator. Further, the steering control section 42 and the braking control section 44 may be mounted to the vehicle 1 at locations close together or separated from one another.

Figure 6:
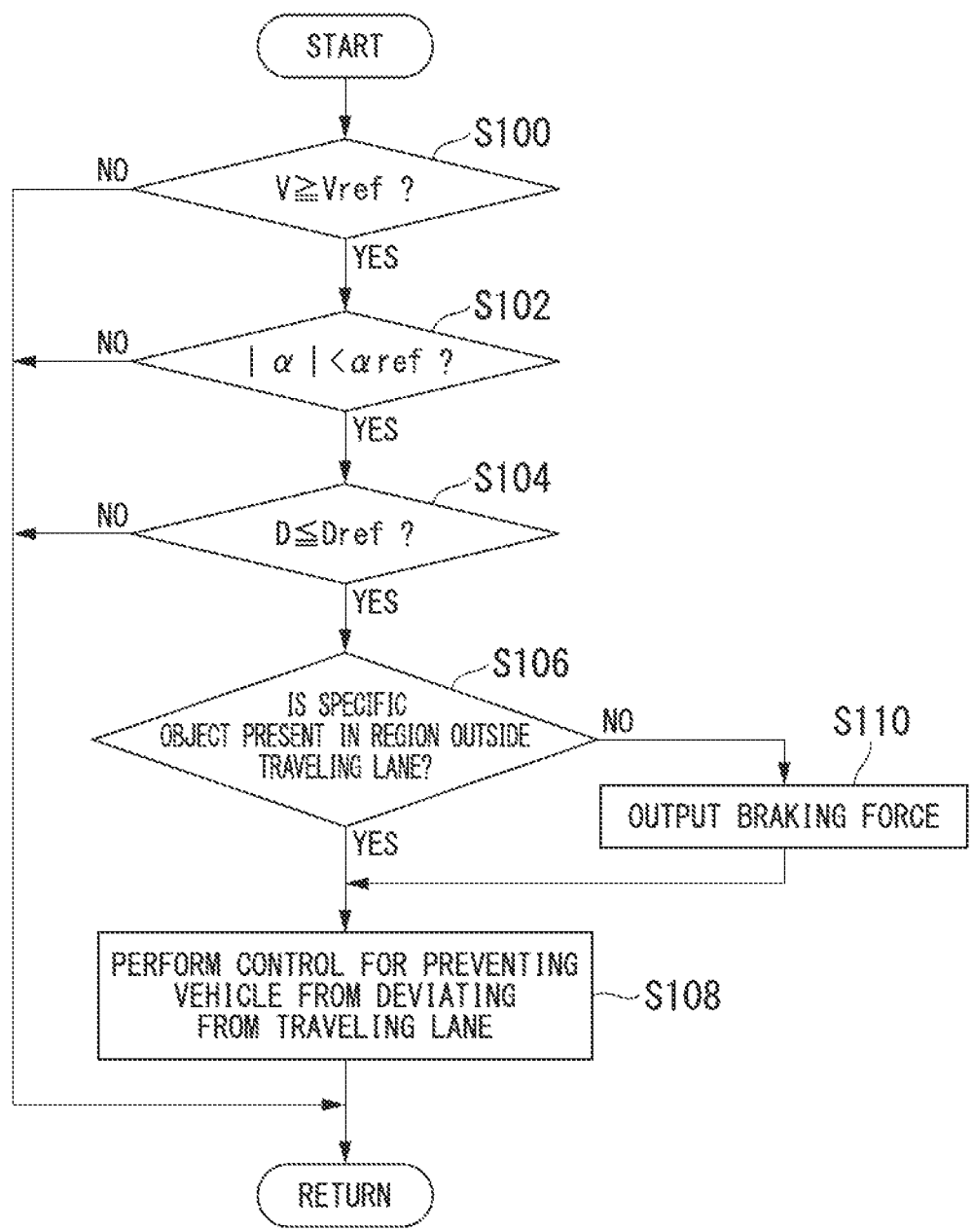
FIG. 6 is a flowchart showing an example of the flow of processes executed by a driving support control section.

The driving support control section 36 generates a control signal for any one or both of the steering control section 42 and the braking control section 44 according to processes described below, and outputs the generated control signal. FIG. 6 is a flowchart showing an example of the flow of the processes executed by the driving support control section 36.

First, the driving support control section 36 determines whether a speed V of the vehicle 1 is equal to or larger than a predetermined speed Vref with reference to a detection value in the vehicle speed sensor 15 (step S100).

If the vehicle speed V of the vehicle 1 is equal to or larger than the predetermined speed Vref, the driving support control section 36 determines whether an absolute value |α| of a steering angle α is smaller than a predetermined value αref with reference to a steering angle signal input from the steering control section 42 (step S102).

If the vehicle speed V of the vehicle 1 is smaller than the predetermined speed Vref, or if the absolute value |α| of the steering angle α is equal to or larger than the predetermined value αref, the driving support control section 36 finishes one routine of the present flowchart without performing processes described thereafter. The reason will be described later.

If the vehicle speed V of the vehicle 1 is equal to or larger than the predetermined speed Vref, and if the absolute value |α| of the steering angle α is smaller than the predetermined value αref, that is, if the vehicle 1 performs normal traveling at a speed of a certain degree or higher without turning at an intersection or entering a garage, the driving support control section 36 performs the following processes.

The driving support control section 36 determines whether a distance D between the "specific object" and the vehicle 1, obtained with reference to the recognition result input from the object recognition section 32, is equal to or smaller than a predetermined distance Dref (step S104).

If the distance D between the specific object and the vehicle 1 exceeds the predetermined distance Dref, the driving support control section 36 finishes one routine of the present flowchart. If the distance D between the specific object and the vehicle 1 is equal to or smaller than the predetermined distance Dref, the driving support control section 36 determines whether the specific object is present in a first state, a state where the specific object is present in a region more outside than the traveling lane (on a side where the vehicle 1 deviates from the traveling lane) with respect to the imaginary line K (step S106).

Figure 7:
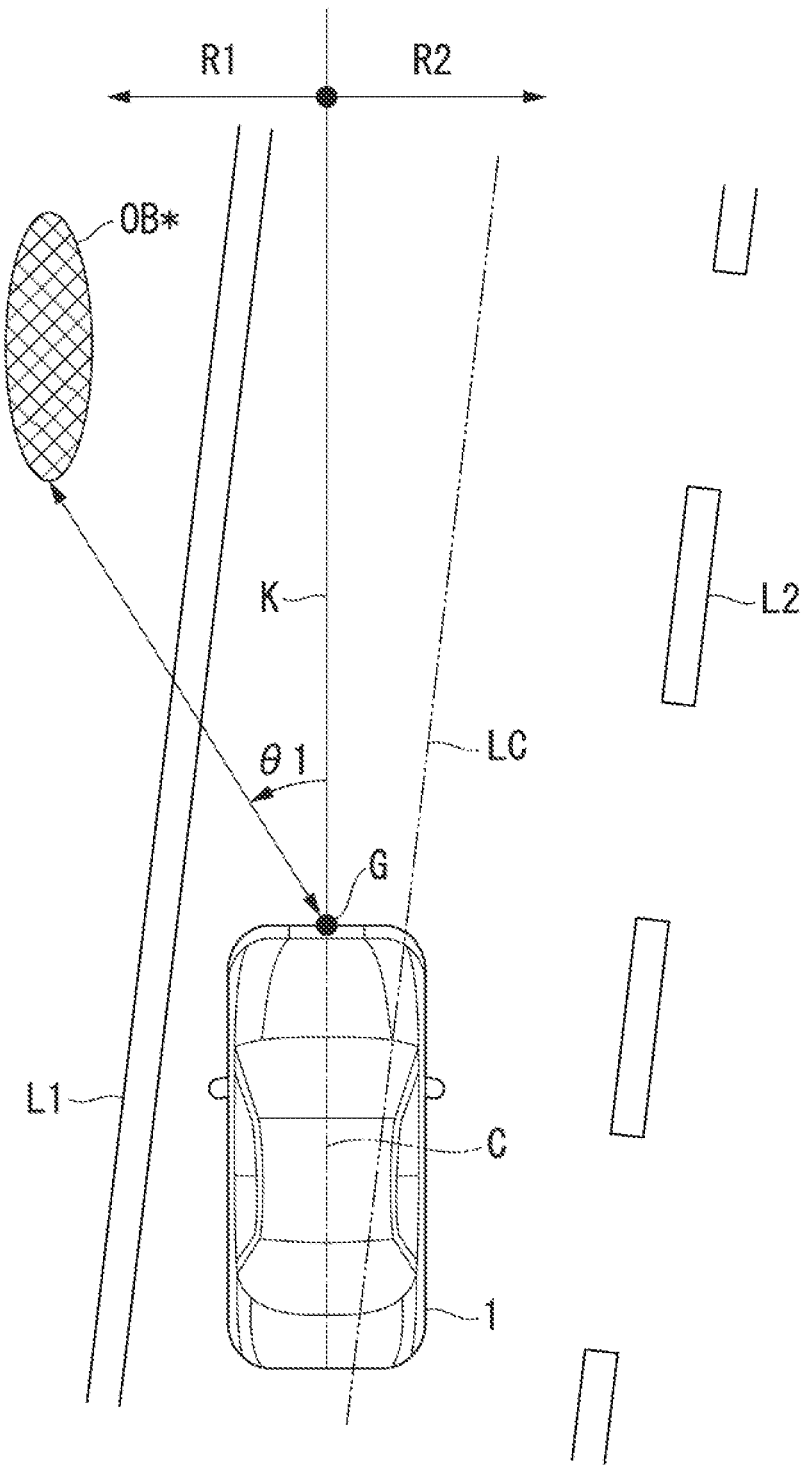
FIG. 7 is a diagram showing an example of a scene in which a specific object is present in a region more outside than a traveling lane (on a side where an own vehicle deviates from the traveling lane) with respect to an imaginary line.

FIG. 7 is a diagram showing an example of a scene in which a specific object OB* is present in a region R1 more outside than the traveling lane (on the side where the vehicle 1 deviates from the traveling lane) with respect to the imaginary line K. Specifically, as shown in FIG. 7, "the region R1 outside the traveling lane (on the side where the vehicle 1 deviates from the traveling lane)" refers to a region that is present on the front side of the vehicle 1 and on a side opposite to the side of the central line LC of the traveling lane when seen from the imaginary line K. In such a first state, there is a high possibility that the vehicle 1 can avoid approaching to the specific object OB* by turning so that the vehicle 1 travels inside of the traveling lane. Accordingly, the driving support control section 36 virtually generates a path for preventing deviation of the vehicle 1 from the traveling lane with reference to the offset distance OFS and the angle θ2 recognized by the road marking recognition section 34, and outputs a control signal to the steering control section 42 for instructing a steering angle which allows the vehicle 1 to travel on the generated path (step S108).

Such a function may also be realized by an instruction to a lane maintenance control system provided separately from the driving support device 30. That is, the driving support control section 36 may perform the determinations from step S100 to step S106, and may output a control signal for instruction of path generation to the existing lane maintenance control system.

Figure 8:
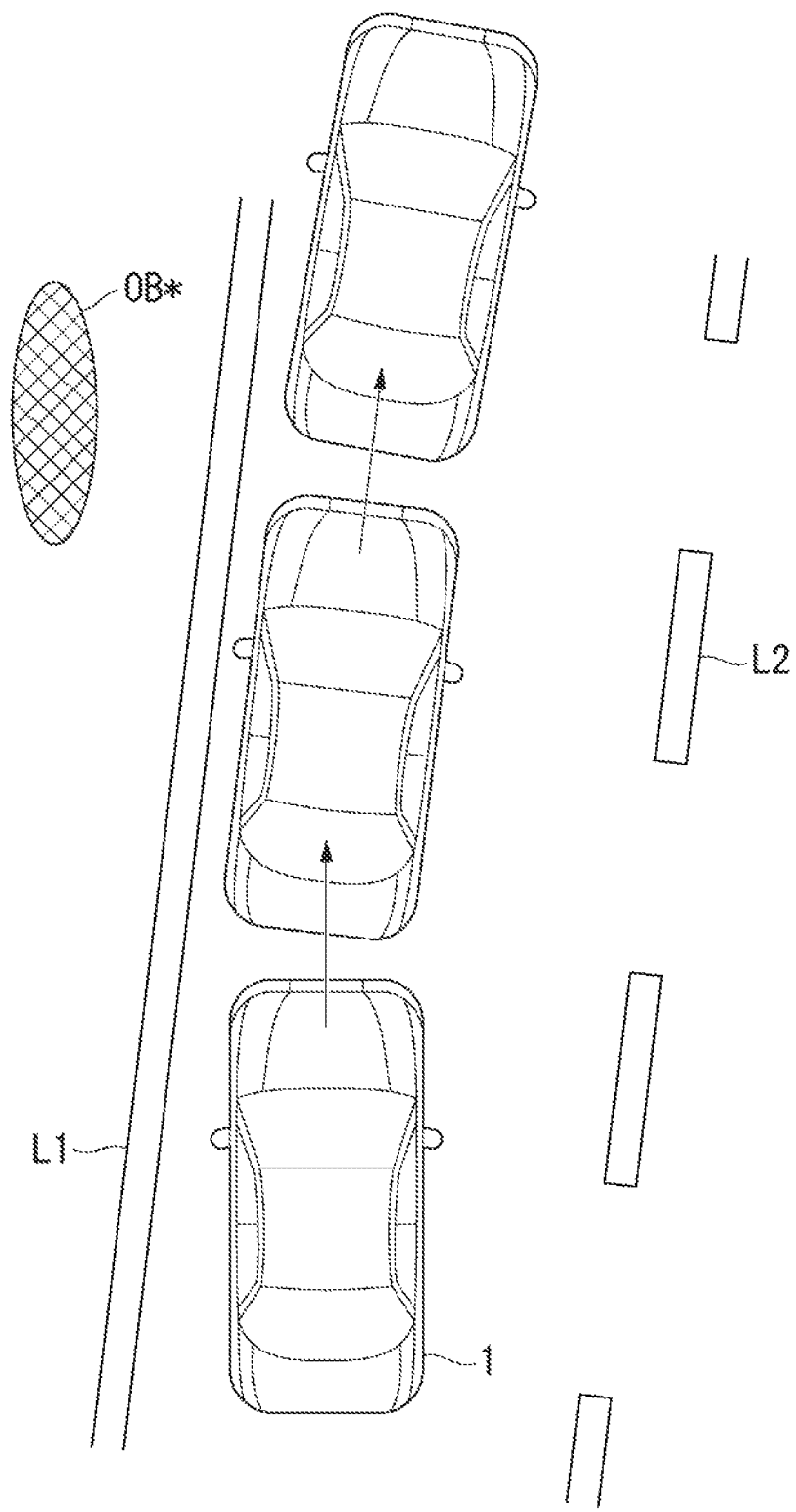
FIG. 8 is a diagram showing a state where a vehicle travels on a generated path to avoid approach to a specific object.

FIG. 8 is a diagram showing a state where the vehicle 1 travels on the path generated as described above to avoid approach to the specific object OB*. In step S108, when the path for preventing deviation of the vehicle 1 from the traveling lane cannot be generated due to a high speed of the vehicle 1, or when the specific object OB* cannot be avoided due to a short time-to-collision (TTC) to the specific object OB*, the driving support control section 36 may first output a control signal for instructing output of a braking force to the braking control section 44, may imaginary generate, after the speed of the vehicle 1 is sufficiently reduced, the path for preventing deviation of the vehicle 1 from the traveling lane, and may output a control signal for instructing a steering angle converted from a turning angle for traveling of the vehicle 1 on the generated path to the steering control section 42.

Figure 9:
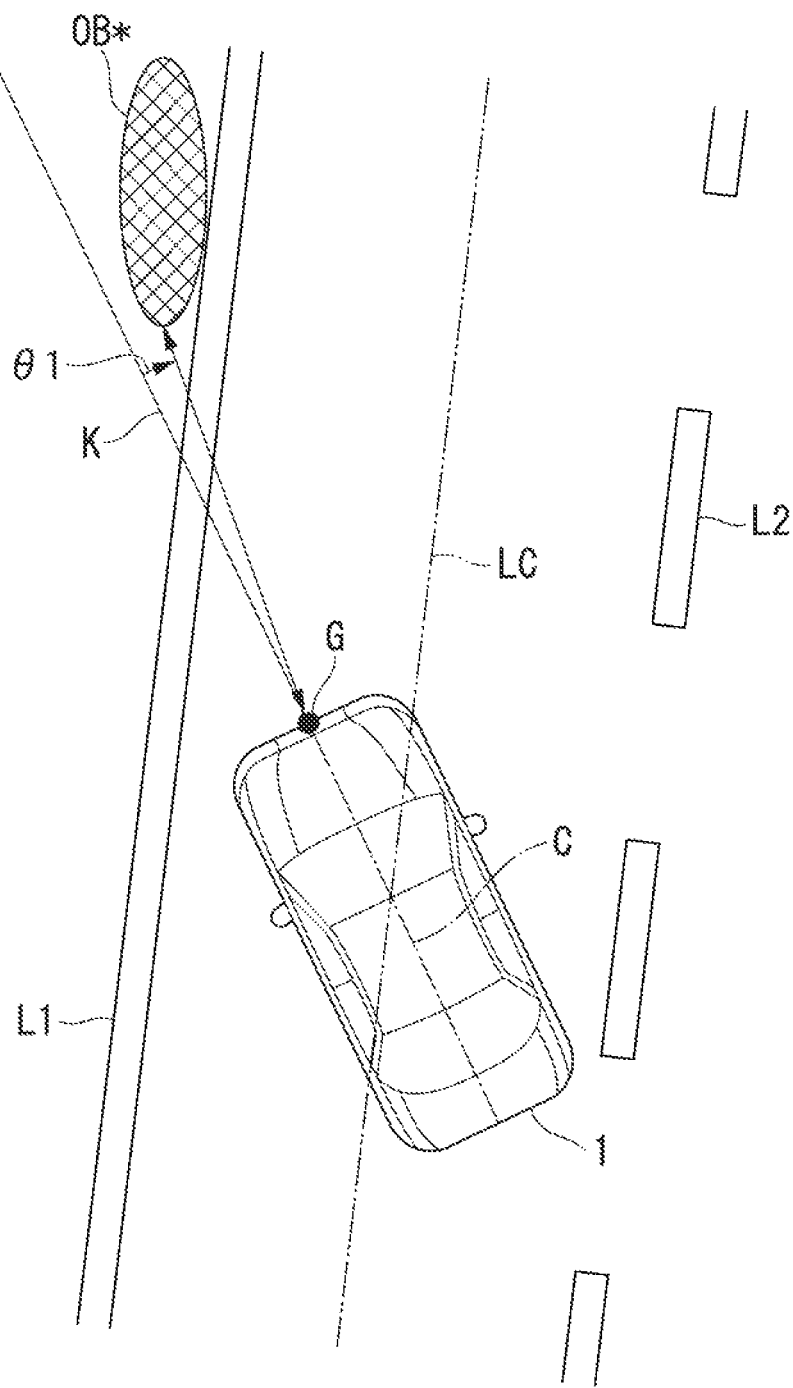
FIG. 9 is a diagram showing an example of a scene in which a specific object is present in a central region of a traveling lane with respect to an imaginary line.

On the other hand, FIG. 9 is a diagram showing an example of a scene in which the specific object OB* is present in a region R2 on a more central side of the traveling lane with respect to the imaginary line K. In such a second state, a possibility of avoiding the approach of the vehicle 1 to the specific object OB* by the steering control of the vehicle 1 is low compared with the scene shown in FIG. 7. Thus, the driving support control section 36 first outputs a control signal for instructing the braking control section 44 to output a braking force according to the speed V of the vehicle 1, the distance between the specific object OB* and the vehicle 1, or the like (TTC may be used) at that time point (step S110), imaginary generates, after the speed of the vehicle 1 is sufficiently reduced, the path for preventing deviation of the vehicle 1 from the traveling lane, and outputs the control signal for instructing the steering angle for traveling of the vehicle 1 on the generated path to the steering control section 42 (step S108).

After the process of step S110, one routine of the flowchart may be finished without proceeding to step S108.

Here, the reason why the processes after step S104 in FIG. 6 are not executed when the vehicle speed V of the vehicle 1 is smaller than the predetermined speed Vref or when the absolute value |α| of the steering angle ca is equal to or larger than the predetermined value αref will be described. When these conditions are satisfied, even though the vehicle 1 moves to deviate from the road, there is a high possibility that the vehicle 1 moves to park in a garage outside the road or turns right or left at an intersection. Accordingly, in such a scene, if the control as in step S108 in FIG. 6 is performed, it is highly likely that the control is against the intention of the driver, and thus, the driver may experience discomfort.

Further, the control signal input to the traveling control unit 40 from the driving support device 30 may be input to the steering control section 42 or the braking control section 44 through a traveling stability control section that performs a traveling stability control based on an individual speed of each vehicle wheel, a yaw rate generated in the vehicle 1, or the like. In this case, for example, when the control signal for instructing the steering angle is input from the driving support control section 36, if it is determined that a slip may occur in the vehicle wheels due to execution of the steering angle, the travel stability control section may first perform a control so that a braking force is output to each vehicle wheel or all the vehicle wheels.

Further, the position of the object OB (or specific object OB*) recognized by the object recognition section 32 may also be used as information for supplementing the position of the road marking recognized by the road marking recognition section 34.

For example, when recognizing the road marking, the road marking recognition section 34 may perform statistical processing such as vote processing. However, when the object OB is present near a candidate of the road marking, the road marking recognition section 34 may perform correction processing for enhancing the reliability of the statistical processing, or the like.

Figure 10:
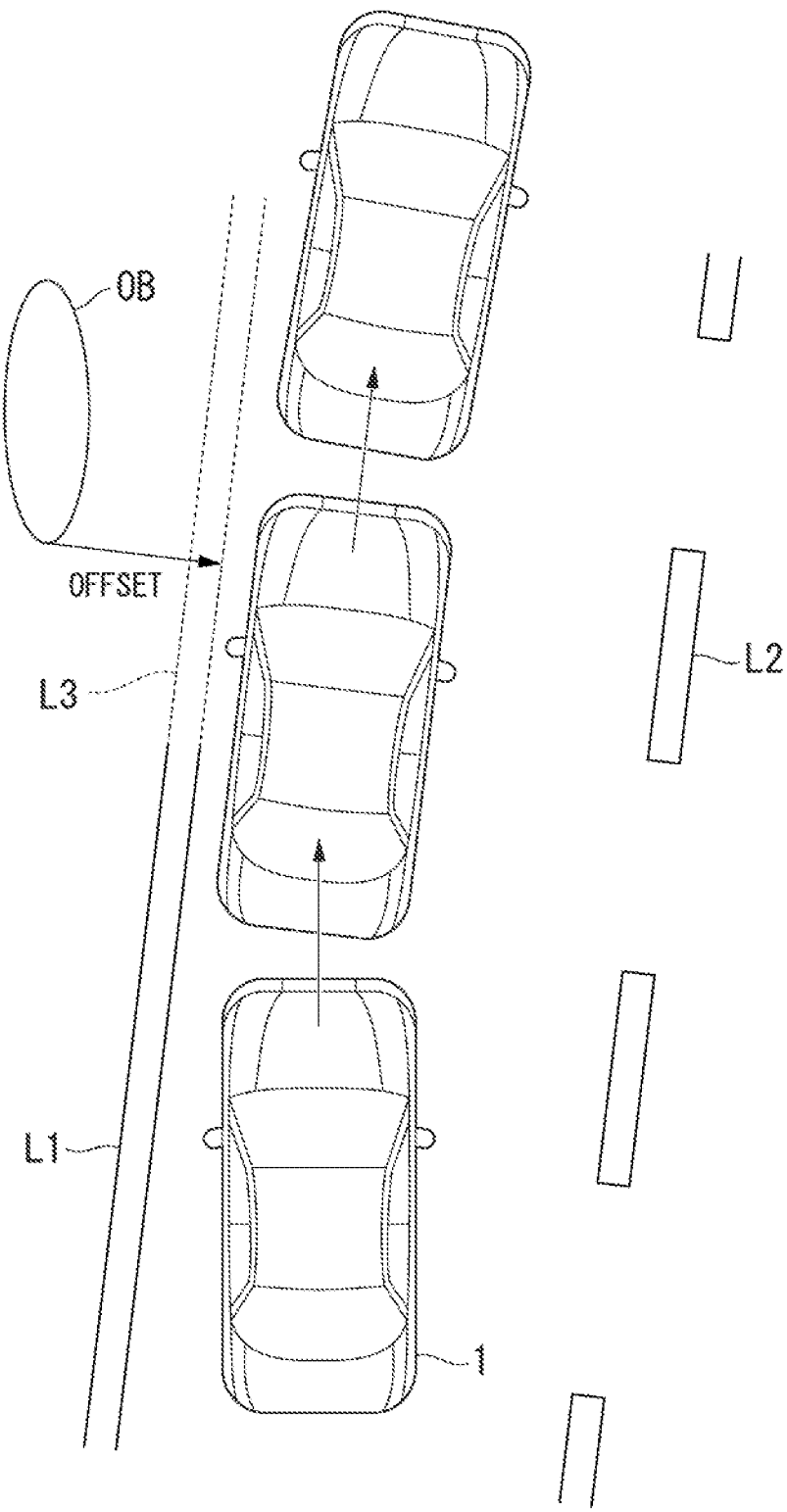
FIG. 10 is a diagram showing a state where imaginary road marking is defined near an object.

Further, when the road marking is scraped and thus is not easily recognizable, the road marking recognition section 34 may define an imaginary road marking L3 near the object OB (at a position offset by a predetermined distance toward the central line LC of the traveling lane from the object OB). FIG. 10 is a diagram showing a state where the imaginary road marking L3 is defined near the object OB.

According to the driving support device 30 of the present embodiment as described above, since different controls are performed on the own vehicle depending on whether the specific object OB* is present in a first state, a state where the specific object OB* is present in the region R1 more outside than the traveling lane (on the side where the vehicle 1 deviates from the traveling lane) with respect to the imaginary line K that extends along the traveling direction of the own vehicle or is present in a second state, a state where the specific object OB* is present in the region R2 on the more central side of the traveling lane with respect to the imaginary line K with reference to the recognition result due to the object recognition section 32 or the road marking recognition section 34, it is possible to reliably protect the specific object OB* from collision with the own vehicle.

Specifically, when the specific object OB* is present in the first state, the state where the specific object OB* is present in the region R1 more outside than the traveling lane (on the side where the vehicle 1 deviates from the traveling lane) with respect to the imaginary line K that extends along the traveling direction of the own vehicle, the driving support device 30 performs a steering control of the vehicle 1 for preventing the vehicle 1 from deviating from the traveling lane. Further, when the specific object OB* is present in the second state, the state where the specific object OB* is present in the region R2 on the more central side of the traveling lane with respect to the imaginary line K, the driving support device 30 performs a braking control of the vehicle 1. Thus, it is possible to reliably protect the specific object OB* from collision with the vehicle 1.

In addition, according to the driving support device 30, when the object OB is present on the left side when seen from the vehicle 1, the imaginary line K is defined as a line that extends from the left end part of the vehicle 1, and when the object OB is present on the right side when seen from the vehicle 1, the imaginary line K is defined as a line that extends from the right end part of the vehicle 1. Thus, it is possible to perform the control of the vehicle 1 on a safer side, and to reliably protect the specific object from collision with the vehicle 1.

Hereinbefore, the invention is described with reference to the exemplary embodiments, but the invention is not limited to the embodiments, and various modifications or substitutions may be made in a range without departing from the spirit of the invention.

For example, in the above-described embodiments, an example in which as the control for preventing the own vehicle from deviating from the traveling lane, the path for preventing the own vehicle from deviating from the traveling lane is imaginary generated and the control signal for instructing the steering angle for allowing the own vehicle to travel on the generated path is output to the steering control section 42 is shown. However, the invention is not limited thereto, output of a steering reaction force, an attention call based on sound, a control for displaying an image that represents a steering direction on a head-up display (HUD), or the like may be performed. Further, the control according to the present embodiment may have an exclusive relation with the existing lane maintenance control system, or may be used in parallel with the existing lane maintenance control system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving support device comprising:
a recognition section configured to recognize each positions of a specific object and a road marking with reference to peripheral information of an own vehicle acquired by a sensor section configured to acquire the peripheral information; and
a control section configured to perform different controls on the own vehicle, with reference to recognition results of the recognition section, depending on whether the specific object is present in a first state or a second state, the first state being a state where the specific object is present in a region more outside than a traveling lane with respect to an imaginary line that extends along a traveling direction of the own vehicle, the second state being a state where the specific object is present in a region on a more central side of the traveling lane in which the own vehicle is at least partially disposed with respect to the imaginary line.

2. The driving support device according to claim 1, wherein the control section performs a control for preventing the own vehicle from deviating from the traveling lane if the specific object is present in the first state, and performs a braking control of the own vehicle if the specific object is present in the second state.

3. The driving support device according to claim 2, wherein the control section performs, when a speed of the own vehicle is equal to or greater than a predetermined speed, different controls on the own vehicle depending on whether the specific object is present in the first state or is present in the second state.

4. The driving support device according to claim 2, wherein the control section performs, when a size of a steering angle of the own vehicle is smaller than a predetermined value, different controls on the own vehicle depending on whether the specific object is present in the first state or is present in the second state.

5. The driving support device according to claim 2, wherein the control section defines the imaginary line as a line that extends toward a front side of the own vehicle from a central part in a vehicle width direction of a front end part of the own vehicle.

6. The driving support device according to claim 2, wherein the control section defines the imaginary line as a line that extends toward a front side of the own vehicle from one of a right end part or a left end part of the own vehicle depending on which side the specific objects is present.

7. The driving support device according to claim 1, wherein the control section performs, when a speed of the own vehicle is equal to or greater than a predetermined speed, different controls on the own vehicle depending on whether the specific object is present in the first state or is present in the second state.

8. The driving support device according to claim 7, wherein the control section performs, when a size of a steering angle of the own vehicle is smaller than a predetermined value, different controls on the own vehicle depending on whether the specific object is present in the first state or is present in the second state.

9. The driving support device according to claim 7, wherein the control section defines the imaginary line as a line that extends toward a front side of the own vehicle from a central part in a vehicle width direction of a front end part of the own vehicle.

10. The driving support device according to claim 7, wherein the control section defines the imaginary line as a line that extends toward a front side of the own vehicle from one of a right end part or a left end part of the own vehicle depending on which side the specific objects is present.

11. The driving support device according to claim 1, wherein the control section performs, when a size of a steering angle of the own vehicle is smaller than a predetermined value, different controls on the own vehicle depending on whether the specific object is present in the first state or is present in the second state.

12. The driving support device according to claim 11, wherein the control section defines the imaginary line as a line that extends toward a front side of the own vehicle from a central part in a vehicle width direction of a front end part of the own vehicle.

13. The driving support device according to claim 11, wherein the control section defines the imaginary line as a line that extends toward a front side of the own vehicle from one of a right end part or a left end part of the own vehicle depending on which side the specific objects is present.

14. The driving support device according to claim 1, wherein the control section defines the imaginary line as a line that extends toward a front side of the own vehicle from a central part in a vehicle width direction of a front end part of the own vehicle.

15. The driving support device according to claim 1, wherein the control section defines the imaginary line as a line that extends toward a front side of the own vehicle from one of a right end part or a left end part of the own vehicle depending on which side the specific objects is present.

16. The driving support device according to claim 1, wherein the specific object is a pedestrian.

17. A driving support device comprising:
a recognition section configured to recognize each positions of a specific object and a road marking with reference to peripheral information of an own vehicle acquired by a sensor section configured to acquire the peripheral information; and
a control section configured to perform different controls on the own vehicle, with reference to recognition results of the recognition section, depending on whether the specific object is present in a first state or a second state, the first state being a state where the specific object is present in a region more outside than a traveling lane with respect to an imaginary line that extends along a traveling direction of the own vehicle, the second state being a state where the specific object is present in a region on a more central side of the traveling lane in which the own vehicle is at least partially disposed with respect to the imaginary line, and
wherein the specific object is located outside of the road marking with respect to the traveling lane.

* * * * *